United States Patent
Takei

(10) Patent No.: US 8,334,080 B2
(45) Date of Patent: Dec. 18, 2012

(54) CATALYST FOR FUEL CELL

(75) Inventor: Fumio Takei, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1751 days.

(21) Appl. No.: 11/072,603

(22) Filed: Mar. 7, 2005

(65) Prior Publication Data

US 2005/0153193 A1 Jul. 14, 2005

Related U.S. Application Data

(63) Continuation of application No. PCT/JP03/08802, filed on Jul. 10, 2003.

(30) Foreign Application Priority Data

Sep. 19, 2002 (JP) .................................. 2002-273176

(51) Int. Cl.
*H01M 4/02* (2006.01)
(52) U.S. Cl. ......... 429/524; 429/526; 429/532; 427/115
(58) Field of Classification Search .............. 429/40–41, 429/44; 427/115; 502/185
See application file for complete search history.

(56) References Cited

U.S. PATENT DOCUMENTS

| | | | |
|---|---|---|---|
| 3,438,817 A | 4/1969 | Short et al. | |
| 5,459,119 A * | 10/1995 | Abe et al. | 502/326 |
| 6,007,934 A | 12/1999 | Auer et al. | |
| 6,066,410 A | 5/2000 | Auer et al. | |
| 7,250,385 B1 * | 7/2007 | Ohno et al. | 502/178 |
| 2002/0009626 A1 | 1/2002 | Terazono et al. | |
| 2002/0039966 A1 * | 4/2002 | Tanaka et al. | 502/332 |
| 2002/0055034 A1 * | 5/2002 | Fukuda et al. | 429/42 |
| 2002/0094472 A1 * | 7/2002 | Xie | 429/44 |
| 2004/0224207 A1 * | 11/2004 | Kamo et al. | 429/32 |

FOREIGN PATENT DOCUMENTS

| | | |
|---|---|---|
| DE | 1 496 249 | 5/1969 |
| DE | 195 34 493 | 3/1997 |
| DE | 197 21 437 | 11/1998 |
| DE | 197 56 880 | 7/1999 |
| EP | 1164651 | 12/2001 |
| JP | 56-155645 | 1/1981 |
| JP | 2000-100448 | 4/2000 |
| JP | 2001-93531 | 4/2001 |
| JP | 2001-357857 | 12/2001 |
| WO | WO 99/21239 | 4/1999 |

OTHER PUBLICATIONS

German Office Action of Application No. 103 93 310 dated Apr. 4, 2006.
Office Action mailed on Oct. 21, 2008 and issued in corresponding Japanese Patent Application No. 2002-273176.

* cited by examiner

*Primary Examiner* — Raymond Alejandro
(74) *Attorney, Agent, or Firm* — Staas & Halsey LLP

(57) ABSTRACT

A catalyst for a fuel cell is disclosed that includes a conductive carrier, and a catalyst layer formed to cover the conductive carrier and formed of one of Pt, Ru, and a Pt-based alloy.

4 Claims, 7 Drawing Sheets

FIG.8

| CATALYST | POWER GENERATION EFFICIENCY |
|---|---|
| 1ST EXAMPLE IMPLEMENTATION | 165 |
| 2ND EXAMPLE IMPLEMENTATION | 155 |
| 3RD EXAMPLE IMPLEMENTATION | 195 |
| 4TH EXAMPLE IMPLEMENTATION | 190 |
| 5TH EXAMPLE IMPLEMENTATION | 160 |
| 6TH EXAMPLE IMPLEMENTATION | 163 |
| 7TH EXAMPLE IMPLEMENTATION | 160 |
| 8TH EXAMPLE IMPLEMENTATION | 158 |
| 9TH EXAMPLE IMPLEMENTATION | 155 |
| 10TH EXAMPLE IMPLEMENTATION | 145 |
| 11TH EXAMPLE IMPLEMENTATION | 150 |
| 12TH EXAMPLE IMPLEMENTATION | 160 |
| 13TH EXAMPLE IMPLEMENTATION | 155 |
| 14TH EXAMPLE IMPLEMENTATION | 160 |
| 15TH EXAMPLE IMPLEMENTATION | 140 |
| 16TH EXAMPLE IMPLEMENTATION | 155 |
| 17TH EXAMPLE IMPLEMENTATION | 150 |
| 18TH EXAMPLE IMPLEMENTATION | 160 |
| COMPARATIVE EXAMPLE | 100 |

CATALYST FOR FUEL CELL

CROSS-REFERENCE TO RELATED APPLICATION

This application is a U.S. continuation application filed under 35 U.S.C. 111(a) claiming benefit under 35 U.S.C. 120 and 365(c) of PCT International Application No. PCT/JP2003/008802, filed on Jul. 10, 2003, which claims priority to Japanese Patent Application No. 2002-273176, filed on Sep. 19, 2002. The entire contents of the foregoing applications are hereby incorporated by reference.

BACKGROUND OF THE INVENTION

1. Field of the Invention

The present invention relates to catalysts for a fuel cell, methods of manufacturing the same, and fuel cells, and particularly to a catalyst having Pt or the like attached on the surface of a conductive carrier.

An oxygen-hydrogen cell is a typical example of the fuel cell. This utilizes the reverse reaction of electrolysis of water. By externally supplying oxygen as the active material of a cathode and hydrogen as the active material of an anode, electrical energy can be extracted. Other active materials of the anode are methanol, ethanol, and methane.

2. Description of the Related Art

Conventionally, fuel cells having large capacity for spaceships, small-scale power stations, and automobiles have been developed. Recently, however, there has been a growing demand for fuel cells as batteries for portable information processing apparatuses such as portable terminals, cellular phones, and notebook PCs.

Fuel cells include direct methanol fuel cells that use methanol as fuel and directly obtain H+ from the methanol and indirect methanol fuel cells that decompose methanol into hydrogen and then obtain H+ from the hydrogen. The indirect-type fuel cells require reactions at high temperatures in order to decompose methanol, and therefore, are not suitable for portable terminals. The direct-type fuel cells have a merit in that it is possible to cause reactions to proceed at room temperature.

In the direct methanol fuel cells, at a cathode and an anode, the following reactions occur at the catalyst surfaces of the respective electrodes:

Anode (fuel electrode): $CH_3OH + H_2O \rightarrow CO_2 + 6H^+ + 6e^-$,

Cathode (air electrode): $3/2 O_2 + 6H^+ + 6e^- \rightarrow 3H_2O$.

Accordingly, the overall reaction is:

Overall reaction: $CH_3OH + 3/2 O_2 \rightarrow 2H_2O + CO_2$.

That is, electrons obtained in this reaction, for instance, six moles of electrons, can be utilized as electrical energy.

Conventionally, a variety of catalysts have been studied in order to increase the speed of the above-described reaction. Of these, catalysts that have a variety of metals, principally platinum, carried on carbon particles or carbon substrate are used, which are specifically catalysts that have metal particulates having electrocatalytic activity, such as Pt particulates or particulates of a Pt alloy of, for instance, Pt and Ru, carried on conductive carbon particles. Rate of reaction on a catalyst surface relates directly to the amount of current, and contributes to power generation efficiency. Accordingly, catalysts having high rates of reaction, that is, catalysts having a great surface area per unit mass (specific surface area), are desired.

According to the conventional method of preparing catalysts, for instance, carbon particles are dispersed in an aqueous solution including a Pt compound. Then, an alkaline aqueous solution is dropped to reduce the Pt compound, and the carbon particles are caused to carry precipitated Pt particulates.

However, according to this method, it is possible to cause the catalytic Pt particulates to adhere to the carbon particles, but the amount is small. Accordingly, there is a problem in that the catalysis is insufficient, thus resulting in an insufficient rate of reaction in fuel cells.

In order to improve catalysis, it is desirable to cover the entire surface of the carbon particles while maintaining the size of the Pt particulates. However, a prolonged period of reduction to increase the amount of precipitated Pt particulates causes a problem in that adjacent Pt particulates on the surface of the carbon particles are coupled by newly precipitated Pt to increase particle size, thus having the opposite effect of reducing surface area to decrease catalysis.

SUMMARY OF THE INVENTION

Accordingly, it is a general object of the present invention to provide a novel and useful catalyst for a fuel cell, a method of manufacturing the same, and a fuel cell in which the above-described disadvantages are eliminated.

A more specific object of the present invention is to provide a catalyst for a fuel cell that is highly active with a high rate of reaction, a method of manufacturing the same, and a fuel cell using the same.

The above objects of the present invention are achieved by a catalyst for a fuel cell including a conductive carrier, and a catalyst layer formed to cover the conductive carrier and formed of one of Pt, Ru, and a Pt-based alloy.

According to the present invention, a catalytic Pt, Ru, or Pt-alloy catalyst layer is formed like a layer so as to cover the surface of a conductive carrier. Accordingly, compared with the conventional case of forming catalyst particulates, the surface area per conductive carrier mass and that per catalyst mass can be increased. Further, since the catalyst is layered, it is possible for the intermediate of a reactant adsorbed to the catalyst surface to move on the surface of the catalyst layer more easily than in the case of the catalyst particulates, thus increasing activity. As a result, it is possible to increase the rate of reaction.

Additionally, metal particulates formed of Pt, Ru, or a Pt-based alloy may be dispersed on the surface of the catalyst layer. This makes it possible to further increase the surface area per conductive carrier mass and that per catalyst mass.

The conductive carrier may be conductive carbon particles. The Pt-based alloy may employ Pt as a principal component and include a Pt group element other than Pt. The catalyst layer may be 0.5 nm to 20 nm in thickness.

The above objects of the present invention are also achieved by a method of manufacturing a catalyst for a fuel cell, including the steps of (a) reducing a compound of a Pt group element in a mixture in one of a gel state and a highly viscous state, the mixture including a solution including the compound of the Pt group element and a conductive carrier, and (b) forming a catalyst layer on a surface of the conductive carrier by burning, the catalyst layer being formed of the Pt group element.

According to the present invention, a Pt group element compound is reduced in a gel or highly viscous state. Therefore, the reduced Pt group element is prevented from making a Brownian motion, thus being prevented from growing into particulates. By decomposing and evaporating a gel or the like by burning in this state, a catalyst layer formed of the Pt group element is formed on the surface of a conductive carrier. Accordingly, the catalyst can be higher in activity and rate of reaction as described above.

The step of causing particulates of a Pt group element to precipitate on the surface of the catalyst layer may be further included. The Pt group element compound may be a Pt compound; be a Ru compound; or employ a Pt compound as a principal component and include a compound of a Pt group element other than Pt. Further, viscosity may fall within the range of 10 cps to $1 \times 10^4$ cps in the highly viscous state.

The above objects of the present invention are also achieved by a fuel cell including a solid electrolyte membrane, and a fuel electrode and an air electrode having the solid electrolyte membrane sandwiched therebetween, wherein the fuel electrode and the air electrode each include a collector and a catalyst part, and one of the catalyst parts of the fuel electrode and the air electrode includes a catalyst, the catalyst having a conductive carrier and a catalyst layer formed to cover the conductive carrier and formed of one of Pt, Ru, and a Pt-based alloy.

According to the present invention, it is possible to increase the rate of reaction of oxidation and reduction reaction in the fuel electrode and the air electrode because of a catalyst having a catalytic Pt, Ru, or Pt-alloy catalyst layer formed like a layer so as to cover the surface of a conductive carrier. As a result, a fuel cell having high power generation efficiency is realized.

BRIEF DESCRIPTION OF THE DRAWINGS

Other objects, features and advantages of the present invention will become more apparent from the following detailed description when read in conjunction with the accompanying drawings, in which:

FIG. 8 is a table illustrating the power generation efficiencies of fuel cells employing the catalysts for a fuel cell of example implementations and a comparative example according to the present invention.

DETAILED DESCRIPTION OF THE PREFERRED EMBODIMENTS

A description is given below of a catalyst for a fuel cell according to an embodiment of the present invention.

Figure 1A:
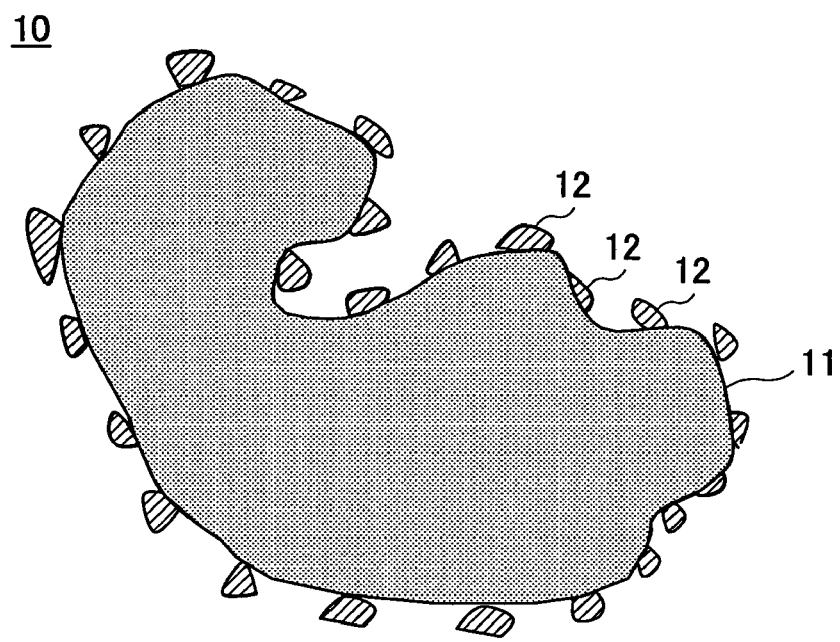
FIG. 1A is a cross-sectional view of a catalyst prepared by the conventional reduction method.
Figure 1B:
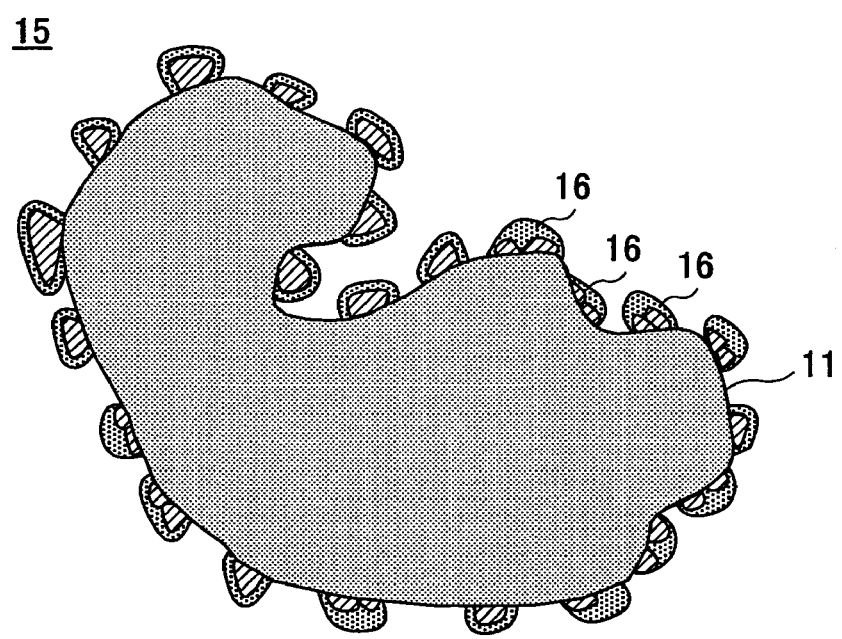
FIG. 1B is a cross-sectional view of a catalyst prepared by reduction of a longer period than FIG. 1A.

The inventor of the present invention found out, through various experiments to increase the activity of a Pt catalyst carried by carbon particles according to the conventional reduction method, that it is difficult to improve activity by a catalyst preparation method according to the conventional reduction method. That is, observation of a cross section of a Pt catalyst 10 prepared by the conventional reduction method illustrated in FIG. 1A with an HRTEM (High Resolution Transmission Electron Microscope) shows that Pt particulates 12 only adhere discretely to the surface of a carbon particle 11, which is a conductive carrier, and do not adhere enough to cover the surface of the carbon particle 11. Accordingly, the mass of the Pt particulates 12 adhering to the carbon particle 11 is small. That is, the specific surface area of the Pt particulates 12 is also small. In a catalyst 15 illustrated in FIG. 1B, prepared by prolonging a period of reduction in the conventional reduction method, the mass of Pt particulates 16 adhering to the carbon particle 11 is increased. However, since the Pt particulates 16 are increased in particle size, there is no increase in the specific surface area. Accordingly, it is inferred that activity is not increased compared with the catalyst 10 illustrated in FIG. 1A.

It is inferred that this is because when a certain amount of Pt particulates adhere to a carbon particle so as to increase the entire surface area of the Pt particulates, the Pt particulates become unstable in terms of energy, so that the Pt particulates adhere to each other to grow as a unit so as to be stable in terms of energy.

Figure 2:
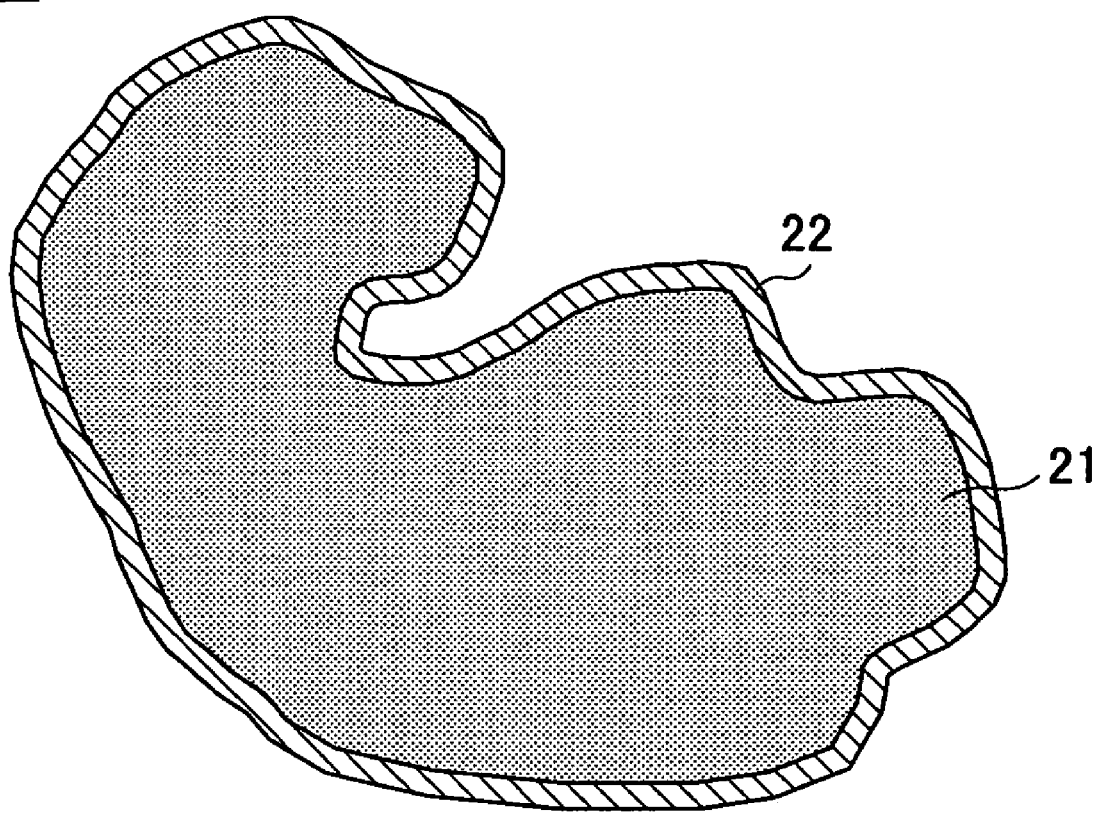
FIG. 2 is a cross-sectional view of a catalyst for a fuel cell according to the present invention.

FIG. 2 is a cross-sectional view of a catalyst for a fuel cell according to an embodiment of the present invention. Referring to FIG. 2, a catalyst 20 for a fuel cell is made up of a conductive carrier 21 and a catalyst layer 22 formed on the surface of the conductive carrier 21. The catalyst layer 22 is made of, for instance, Pt, and the conductive carrier 21 is made of, for instance, a conductive carbon particle. The Pt layer is thus formed to be thin on the surface of the conductive carbon particle. Accordingly, there is an increase in the surface area and activity compared with a catalyst according to the conventional reduction method. Further, the catalyst layer 22 is formed continuously on the surface of the conductive carrier. Accordingly, it is inferred that it is easy for a reactant or the intermediate of the reactant adsorbed to the surface of the catalyst layer 22 to move on the surface of the catalyst layer 22 so that activity is further increased. Accordingly, the rate of reaction is further increased.

An electroconductive material such as a carbon particle or porous Ni with a great surface area is employed as the conductive carrier 21. The BET value of the conductive carrier 21 is preferably within the range of 100 m$^2$/g to 2000 m$^2$/g. The surface area of the catalyst layer 22 of Pt or the like cannot be secured sufficiently with values less than 100 m$^2$/g. With values greater than 2000 m$^2$/g, the conductive carrier 21 is so small as to make it difficult to disperse in a solution in the below-described manufacturing methods. The specific resistance of the conductive carrier 21 is preferably $10^{-1}$ Ω·cm to $10^2$ Ω·cm in serving as a medium that conducts electrons and protons generated by the catalyst oxidizing methanol or the like. For instance, in the case of a carbon particle, KETJENBLACK EC-600J (name of a Ketjenblack International Corporation product), which is conductive carbon black, is employed. carbon particle or porous Ni with a great surface area is employed as the conductive carrier 21. The BET value of the conductive carrier 21 is preferably within the range of 100 m$^2$/g to 2000 m$^2$/g. The surface area of the catalyst layer 22 of Pt or the like cannot be secured sufficiently with values less than 100 m$^2$/g. With values greater than 2000 m$^2$/g, the conductive carrier 21 is so small as to make it difficult to disperse in a solution in below-described manufacturing methods. The specific resistance of the conductive carrier 21 is preferably $10^{-1}$ Ω·cm to $10^2$ Ω·cm in serving as a medium that conducts electrons and protons generated by the catalyst oxidizing methanol or the like. For instance, in the case of a carbon particle, KETJENBLACK EC-600J (name of a Ketjenblack International Corporation product) is employed.

The catalyst layer 22 may be not only Pt but also a Ru or Pt alloy, for instance, an alloy composed principally of Pt with another Pt group element added thereto, such as PtRu or PtRh. PtRu or the like can reduce poisoning with respect to carbon monoxide generated in a fuel cell. According to measurement of an HRTEM photograph of a cross section, the catalyst layer 22 is preferably formed to be 0.5 nm to 20 nm in thickness. The catalyst layer 22 cannot sufficiently cover the surface of the conductive carrier 21 if it is thinner than 0.5 nm. On the other hand, if it is thicker than 20 nm, the specific surface area is reduced.

With respect to the specific surface area of the catalyst 20 for a fuel cell of this configuration according to this embodiment of the present invention, the specific surface area according to pulse CO adsorption is preferable within the range of 200 $m^2/g$ to 5000 $m^2/g$. The rate of reaction in a fuel cell is low if it is less than 200 $m^2/g$, and the stability of the catalyst for a fuel cell over time is reduced if it is greater than 5000 $m^2/g$.

A description is given below of methods of manufacturing a catalyst for a fuel cell according to embodiments of the present invention.

The manufacturing methods according to the present invention are characterized in that a Pt group element compound solution including a Pt group element acid or salt is reduced in a gel or highly viscous state; a precipitated catalyst is prevented from growing into catalyst particles by confining the precipitated catalyst in a three-dimensional network structure of a gel or highly viscous material to restrict Brownian motion; and a catalyst layer is formed in a layered manner on the surface of a conductive carrier by burning. Compared with the conventional reduction method in a solution, the specific surface area per catalyst mass and that per conductive carrier mass can be increased, so that the rate of reaction as a catalyst can be increased. A specific description is given below of the manufacturing methods.

[First Embodiment]

This embodiment is a case of manufacturing a catalyst for a fuel cell by reducing a Pt group element compound in a gel state.

Figure 3:
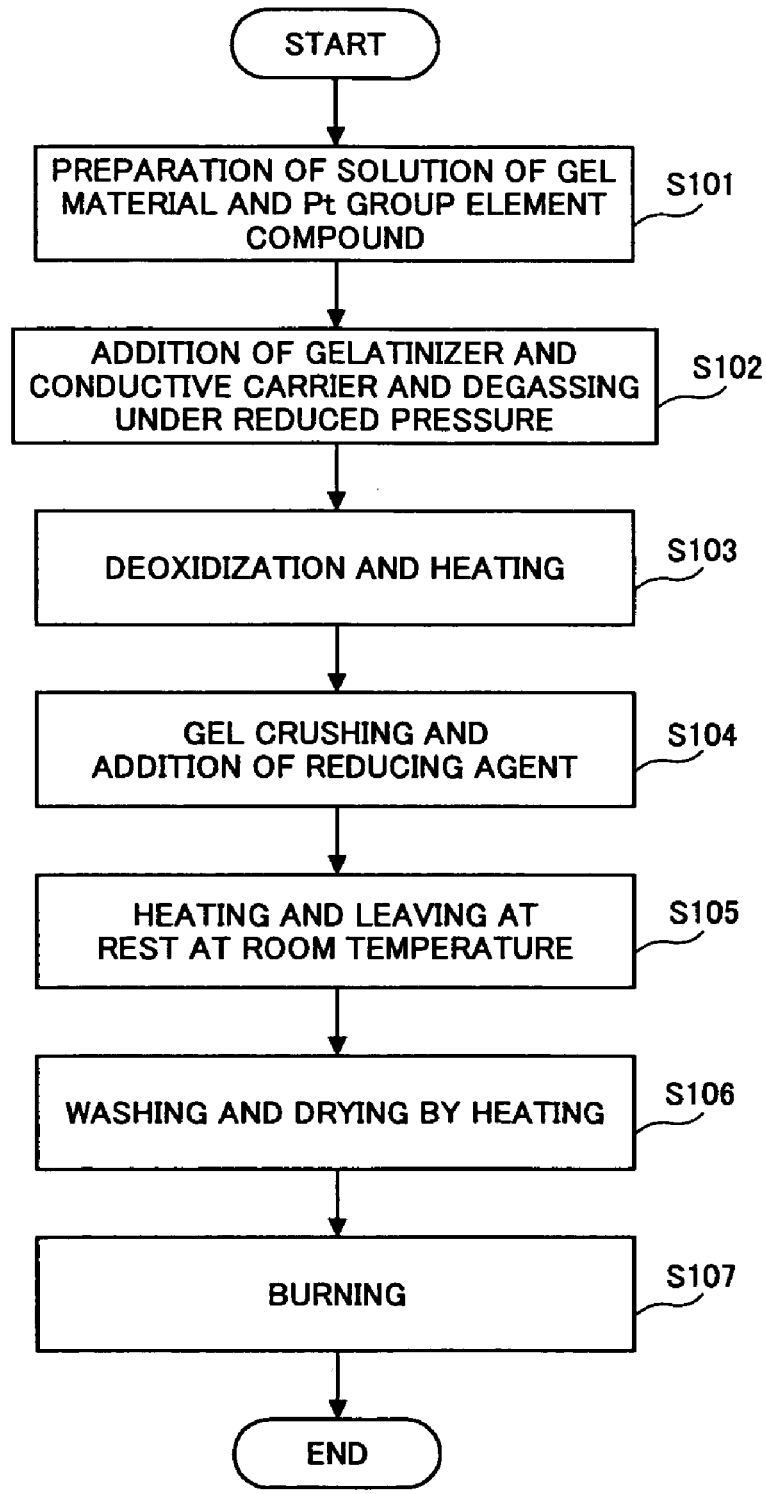
FIG. 3 is a flowchart illustrating a process of manufacturing a catalyst for a fuel cell according to a first embodiment of the present invention.

FIG. 3 is a flowchart illustrating a process of manufacturing a catalyst for a fuel cell according to this embodiment. A description is given below, with reference to FIG. 3, of the manufacturing process.

First, a solution of a gel material and a Pt group element compound is prepared (S101). Specifically, the gel material and a predetermined amount of the Pt group element compound are mixed with water and completely dissolved by heating.

For instance, a monomer, a dimmer, an oligomer, or a polymer is employable as the gel material. The gel material may be any of those producing gel by a crosslinking reaction with a below-described gelatinizer. That is, the gel material may be any of those becoming an organic polymer by a crosslinking reaction or be a polymer itself forming a three-dimensional network structure with a low molecular weight material.

The Pt group element compound is an acid or salt of a Pt group element such as Pt, Ru, or Rh. For instance, a hexachloroplatinic acid ($H_2PtCl_6$), platinum chloride ($PtCl_4$), ruthenium chloride ($RuCl_3$), or rhodium chloride ($RhCl_3$) is employable as a Pt, Ru, or Rh acid or salt. These compounds may also be employed in combination.

Next, a gelatinizer serving as a crosslinking agent is added to the obtained solution, to which a conductive carrier is further added. The conductive carrier is dispersed in the solution while degassing is performed under reduced pressure (S102). It is preferable to use a homogenizer or an ultrasonic disperser in order to disperse the conductive carrier.

Specifically, a crosslinking agent suitable for the above-described gel material is selected. For instance, bis-acrylamide or a diacrylate monomer is employable with respect to the gel material of acrylamide. These crosslinking agents have two or more reactive bonding parts, which bond to the reactive bonding parts of the gel material to cause crosslinkage to be generated between the principal chains of the polymer, thereby forming a three-dimensional network structure.

The above-described material is employed for the conductive carrier. A dispersing agent promoting dispersion of carbon may be employed as required.

Next, this solution is subjected to bubbling with nitrogen so as to reduce the oxygen concentration of the solution. While removing oxygen, which inhibits the reaction of a reducing agent described below, the solution is heated to approximately 90° C. for approximately 1 hour using a hot plate so as to be gelatinized (S103). Specifically, heating temperature is set to 50° C. to 200° C., and heating time is set to 0.1 hours to 5 hours. The obtained gel is preferably a hard gel substantially like agar in terms of prevention of growth of catalyst particles.

Next, the gel is crushed into 5 mm pieces using a rotary mixer, and is introduced into an aqueous solution including a reducing agent (S104). After being heated approximately at 80° C. for 2 hours, the solution is left at rest at room temperature (S105). Formaldehyde or hydroquinone may be employed as the reducing agent. Specifically, in the case of, for instance, formaldehyde, the concentration of the reducing agent is preferably 0.1% to 10%, and more preferably 1% to 3%, in terms of the rate of reaction. Further, heating temperature is set to 50° C. to 100° C., and heating time is set to 0.5 hours to 10 hours. The rest period after heating is preferably 8 hours to 15 hours in terms of uniform formation of a catalyst layer.

Next, after discarding the reducing agent and washing the gel with water, the gel is heated to approximately 150° C. in the atmosphere to be dried (S106).

Next, the gel is burned at 650° C. for 2 hours in the atmosphere using an oven (S107). The network structure forming the gel is decomposed and gasified, so that a catalyst incorporated in the network structure is formed like a layer on the conductive carrier.

According to the manufacturing method of this embodiment, the Pt group element compound is reduced in a gel state. Accordingly, the Pt group element precipitated by reduction, whose Brownian motion is restricted by the three-dimensional network structure of the gel, is prevented from growing into particulates. Accordingly, as a result of decomposition and evaporation of the three-dimensional network structure by burning, a layer-like catalyst layer is formed on the surface of the conductive carrier. As a result, it is possible to increase the specific surface area of the catalyst per catalyst mass and that per conductive carrier, and thus to increase activity.

Alternative gel materials are animal proteins such as casein, gelatin, and collagen; plant proteins such as wheat-derived protein and soybean-derived protein; cellulose such as wood pulp cellulose; plant seed-derived mucilage such as gum guaiac and locust bean gum; seaweed-derived mucilage such as agar and carrageenan; plant leaf mucilage such as gum Arabic and tragacanth gum; plant fruit mucilage such as pectin; plant rhizome mucilage such as mannan; microbeproduced mucilage such as pullulan, xanthan gum, and dextran; cellulose derivatives such as methyl cellulose, ethyl cellulose, hydroxypropylcellulose, carboxymethycellulose, carboxymethylethylcellulose, celluloseacetate phthalate, and hydroxypropylmethylcellulose phthalate; and starch derivatives such as soluble starch and carboxymethyl starch. Methods of forming a gel state using these gel materials do not require the above-described crosslinking agent. The heating temperature and the temperature after heating of step S103 are set in accordance with the gelatinization conditions of the gel material, such as gelatinization temperature. For instance, gelatin and agar are gelatinized when being cooled to or below the gelatinization temperature, and pectin is gelatinized when the gelatinization temperature is reached or exceeded. These gel materials are also employable as a below-described thickener depending on heating temperature and blending quantity. Polyvinyl acetal and a gel body formed of a polyion complex are employable as alternative gel materials.

[Second Embodiment]

This embodiment is a case of manufacturing a catalyst for a fuel cell by reducing a Pt group element compound in a highly viscous state.

Figure 4:
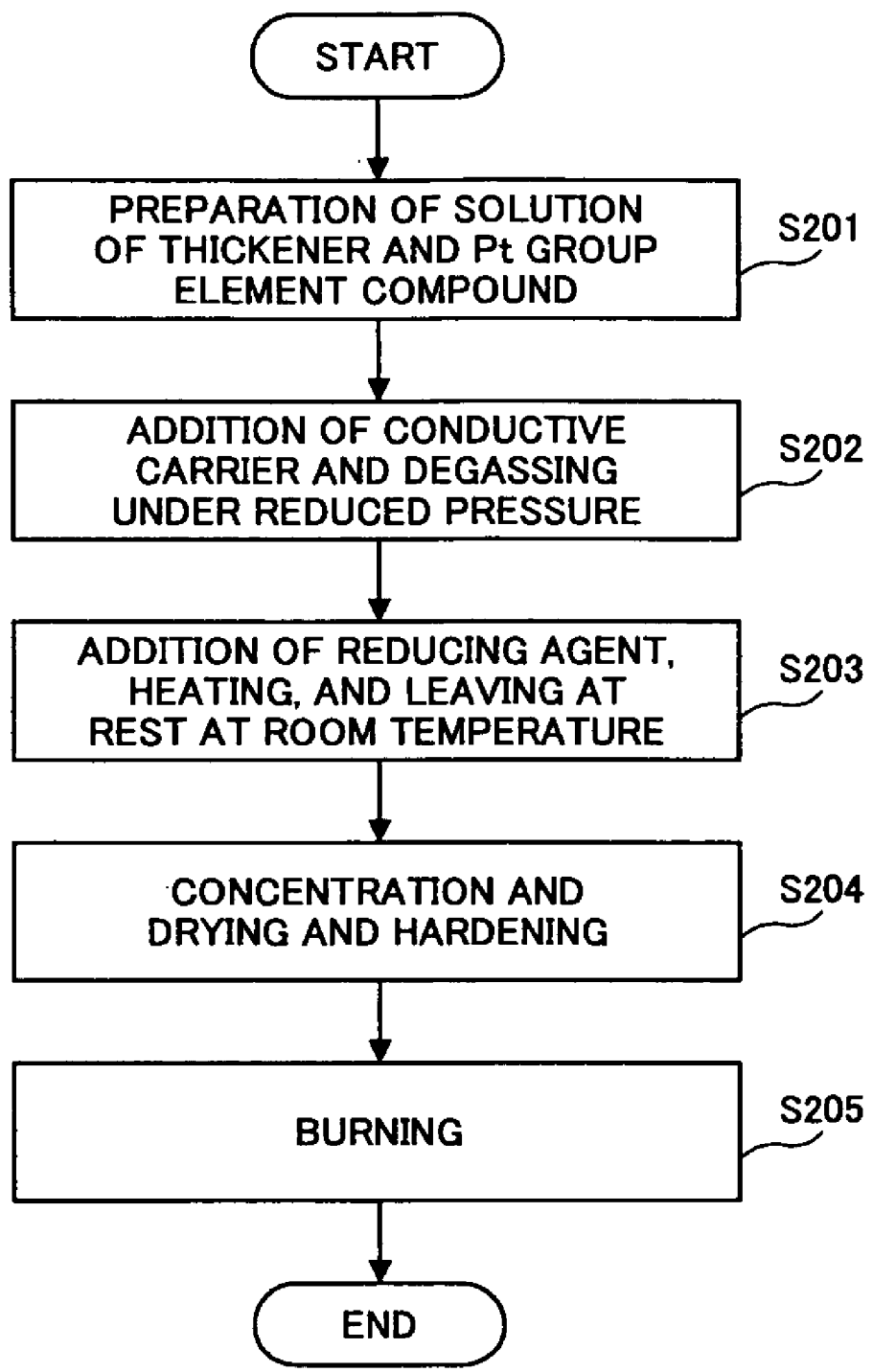
FIG. 4 is a flowchart illustrating a process of manufacturing a catalyst for a fuel cell according to a second embodiment of the present invention.

FIG. 4 is a flowchart illustrating a process of manufacturing a catalyst for a fuel cell according to this embodiment. A description is given below, with reference to FIG. 4, of the manufacturing process.

First, a solution of a thickener and a Pt group element compound is prepared (S201). Specifically, a predetermined amount of the Pt group element compound is gradually added to an aqueous solution in which the thickener is dissolved. While being heated to approximately 60° C., the solution is mixed with water, thereby heating and completely dissolving the Pt group element compound.

The thickener may be any of the following polyoxyalkylene compounds and acrylic water viscous agent polymers, and mixtures of two or more of them. The polyoxyalkylene compounds are polyethyleneglycol, polyoxyethyleneoxide, alkyleneoxide (such as ethyleneoxide or propyleneoxide)-modified polyhydric alcohols, and polyoxyethylene oxypropyleneglycol (a block or random copolymer of ethyleneoxide and propyleneoxide). The acrylic water viscous agent polymers are polyacrylamide, polymethacrylamide, polyacrylate or salts thereof, polymethacrylate or salts thereof, 2-alkyl-2-acrylamide propane sulfonate or salts thereof such as 2-alkyl-2-acrylamide propane sodium sulfonate, (meth)acryloyloxy-alkyltrialkyl tetraammonium such as methacryloyloxyethyltrimethylammonium chloride, and (meth)acryloyloxyalkyldialkyl amine salt such as a tri- or tetra-salt of diethylaminoethylmethacrylate. Further, as the Pt group element compound, the same acid or salt as in the first embodiment may be employed.

Next, a conductive carrier is added to the obtained solution, and the conductive carrier is dispersed in the solution while degassing is performed under reduced pressure (S202). A homogenizer or an ultrasonic disperser may be employed in order to disperse the conductive carrier. The same conductive carrier as in the first embodiment may be employed as the conductive carrier.

Next, an aqueous solution including a reducing agent is gradually added to this solution. After being stirred for approximately 2 hours at approximately 80° C., the solution is left at rest at room temperature (S203). The reducing agent is the same as in the first embodiment. The heating temperature here is set to 50° C. to 95° C., and the heating time is set to 0.1 hours to 5 hours. The rest period after heating is preferably 8 hours to 15 hours in terms of uniform growth of a catalyst layer. At the time of heating, a viscosity at, for instance, 80° C. is preferably $10\text{-}1\times 10^4$ cps according to a B-type viscometer. Further, viscosity at room temperature after slow cooling is preferably 100 cps to $1\times 10^5$ cps according to a B-type viscometer.

Next, this aqueous solution after completion of the reduction reaction is concentrated and dried and hardened using a rotary evaporator, and is further heated to approximately 150° C. so as to be dried completely (S204).

Next, this dry material is subjected to burning for approximately 2 hours at approximately 650° C. in the atmosphere using an oven (S205). A material forming the state of high viscosity is decomposed and evaporated, so that an incorporated catalyst is formed like a layer on the conductive carrier. Specifically, burning temperature is set to 500° C. to 800° C., and burning time is set to 1 hour to 5 hours. At burning temperatures higher than 800° C., the surface of the catalyst layer is oxidized to become as if poisoned, thus resulting in a decrease in catalysis. At temperatures lower than 500° C., it is not possible to decompose and evaporate the highly viscous material sufficiently.

According to the manufacturing method of this embodiment, the Pt group element compound is reduced in the state of high viscosity. Accordingly, the Pt group element precipitated by reduction, whose Brownian motion is restricted by the high viscosity of the solution, is prevented from growing into particulates. Accordingly, as a result of decomposition and evaporation of the material realizing high viscosity by burning, a layer-like catalyst layer is formed on the surface of the conductive carrier. As a result, it is possible to increase the specific surface area of the catalyst per catalyst mass and that per conductive carrier, and thus to increase activity.

[Third Embodiment]

This embodiment is a case of manufacturing catalysts for a fuel cell by further having catalytic Pt group element particulates precipitated and carried on the surface of the catalysts for fuel cells obtained by the first and second embodiments.

Figure 5:
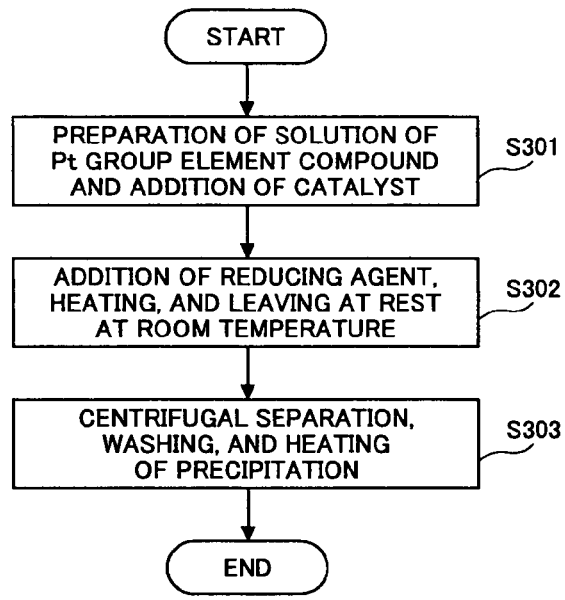
FIG. 5 is a flowchart illustrating a process of manufacturing a catalyst for a fuel cell according to a third embodiment of the present invention.

FIG. 5 is a flowchart illustrating a process of manufacturing a catalyst for a fuel cell according to this embodiment. A description is given below, with reference to FIG. 5, of the manufacturing process.

First, a Pt group element compound solution is prepared, a catalyst obtained by the first or second embodiment is added thereto, and dispersion is performed using a homogenizer (S301).

Next, a reducing agent is gradually added to this mixture solution, which is heated approximately at 80° C. for 2 hours and is left at rest at room temperature (S302).

After subjecting to centrifugal separation and washing with water, this precipitation is heated for 2 hours at 300° C. in a $N_2$ atmosphere so as to form a catalyst (S303).

Figure 6:
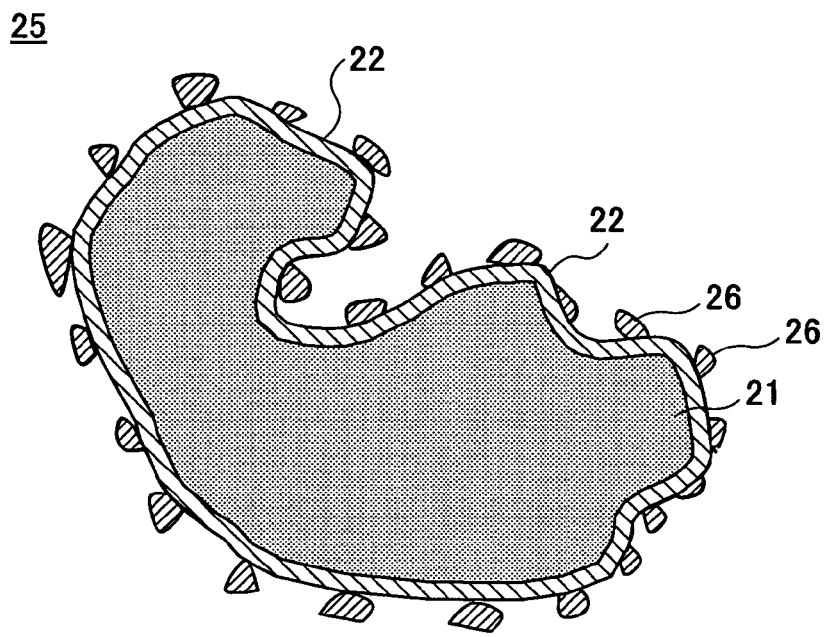
FIG. 6 is a cross-sectional view of the catalyst for a fuel cell according to the third embodiment of the present invention.

FIG. 6 is a cross-sectional view of a catalyst 25 for a fuel cell according to this embodiment. Referring to FIG. 6, catalyst particulates 26 formed of a Pt group element are precipitated on and adhere to the catalyst layer 22, formed on the surface of the conductive carrier 21, obtained by the first or second embodiment. These catalyst particulates 26 make it possible to increase the specific surface area of the catalyst per catalyst mass and that per conductive carrier and thus to increase activity.

According to this embodiment, as described above, catalyst particulates are further formed on the catalyst layer formed on the surface of the conductive carrier, the catalyst layer being obtained by the first or second embodiment. These catalyst particulates make it possible to increase the specific surface area of the catalyst per catalyst mass and that per conductive carrier and thus to increase activity.

[Fourth Embodiment]

Figure 7:
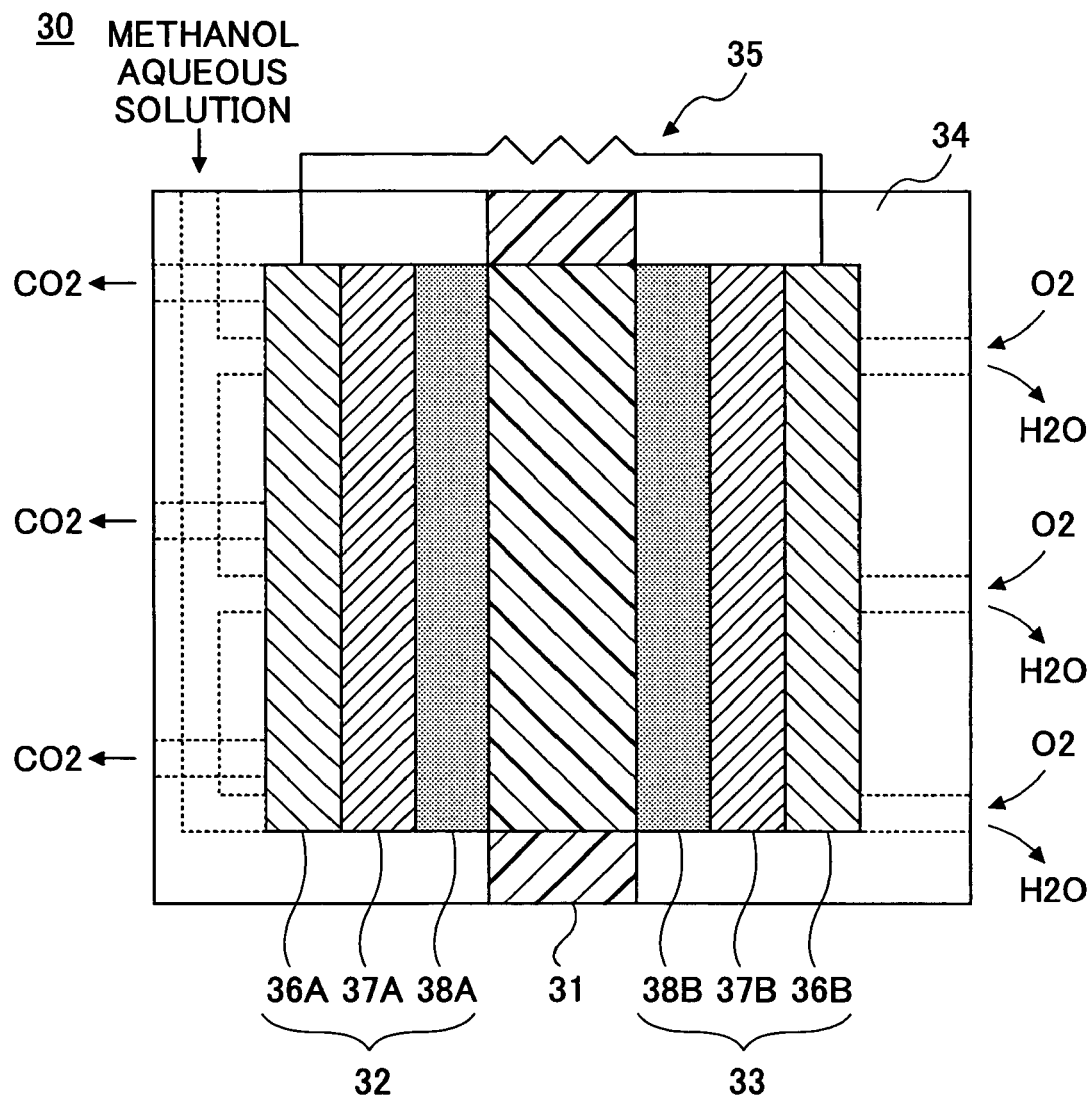
FIG. 7 is a diagram illustrating a fuel cell according to a fourth embodiment of the present invention.

FIG. 7 is a diagram showing a fuel cell 30 according to this embodiment. Referring to FIG. 7, the fuel cell 30 of this embodiment is made up principally of a solid electrolyte membrane 31, a fuel electrode 32 and an air electrode 33 on both sides of the solid electrolyte membrane 31, a case 34 housing these, an external circuit 35 to which a load is connected for extracting power from the fuel cell 30, etc.

The solid electrolyte membrane 31 is formed of a proton-conductive polymer material, and for instance, NAFION N-115 (product name) of DuPont, which is a sulfonated tetrafluoroethylene-based fluoropolymer-copolymer, is employable.

The fuel electrode 32 and the air electrode 33 are formed of collectors 36A and 36B and catalyst layers (catalyst parts) 38A and 38B applied on carbon papers 37A and 37B, respectively. The catalyst layers 38A and 38B are configured to come into contact with the solid electrolyte membrane 31. The catalyst for a fuel cell of any of the first through third embodiments is employed as the catalyst layers 38A and 38B. Approximately 2 g of a catalyst for a fuel cell obtained by any of the first through third embodiments is kneaded with 20 g of 5% by mass of a NAFION solution to be formed like a paste, which is applied on a carbon paper by doctor blade coating or bar coating with a thickness being set to approximately 50 μm to 300 μm.

The collectors 36A and 36B, each formed of a mesh of a highly corrosion-resistant alloy such as stainless steel, collect electrons generated in the catalyst layer (catalyst part) 38A of the fuel electrode 32 through the carbon paper 37A, or supply electrons flowing from the external circuit 35 evenly to the catalyst layer (catalyst part) 38B.

A methanol aqueous solution is supplied to the fuel electrode 32 side, so that the reaction of $CH_3OH+H_2O \rightarrow CO_2 + 6H^+ + 6e^-$ occurs on the catalyst surface of the catalyst layer 38A. The generated protons are conducted through the solid electrolyte membrane 31 to reach the air electrode 33, and the electrons flow through the load connected to the external circuit 35 to reach the air electrode 33. Oxygen in the air is supplied to the air electrode 33 side, so that the reaction of $3/2O_2+6H^++6e^- \rightarrow 3H_2O$ occurs on the catalyst surface of the catalyst layer 38B. As a result, water is generated from the oxygen, protons, and electrons.

The fuel cell 30 of this embodiment is characterized by the catalyst of the catalyst layers 38A and 38B. The catalyst covers the surface of a carbon particle, which is a carrier, in a layered manner. Therefore, the specific surface area of the catalyst of the catalyst layers 38A and 38B with respect to mass is great, so that it is highly probable that a reactant comes into contact with the catalyst, that is, the rate of reaction is high. As a result, power generation efficiency is improved.

A description is given below of example implementations according to the present invention and a comparative example that is not according to the present invention.

FIRST EXAMPLE IMPLEMENTATION 200 ml of a 30% aqueous solution of acrylamide and 200 ml of a 2% aqueous solution of bis-acrylamide were mixed. Further, 1.5 g of hexachloroplatinic acid was added, and was dissolved completely by heating to 60° C. Next, after adding 40 ml of a 10% aqueous solution of potassium persulfate, 0.6 g of KETJENBLACK EC-600J was introduced as conductive carrier carbon particles. Degassing was performed under reduced pressure, and stirring was performed. While being subjected to bubbling with nitrogen gas so as to reduce the concentration of oxygen in the solution, this solution was heated for 1 hour at 90° C. using a hot plate. As a result, a gel was obtained.

Next, the gel was crushed into pieces of several mm and introduced into 1000 ml of a 3.5% aqueous solution of formaldehyde. After being heated for 2 hours at 80° C., it was left at rest for 10 hours at room temperature. Then, the formaldehyde aqueous solution was discharged, and the gel was lightly washed with water. The gel was dried by heating for 3 hours at 150° C. in the atmosphere. The gel was further subjected to burning for 2 hours at 650° C. in the atmosphere. As a result, the Pt catalyst of this example implementation was obtained.

An HRTEM observation of a cross section of the Pt catalyst of this example implementation showed that the Pt catalyst layer was 2 nm in thickness, and the specific surface area according to pulse CO adsorption was 1200 $m^2/g$.

SECOND EXAMPLE IMPLEMENTATION 1.5 g of hexachloroplatinic acid was gradually added to and was dissolved completely in 500 ml of a 10% aqueous solution of polyvinylpyrrolidone (K-90) by heating to 60° C. Next, 0.6 g of KETJENBLACK EC-600J was introduced as carrier carbon. Stirring was performed while performing degassing under reduced pressure. 1000 ml of a 3.5% aqueous solution of formaldehyde was gradually added to this solution. It was heated for 2 hours at 80° C. while being stirred, and thereafter was left at rest for 10 hours at room temperature. The viscosity at the time of heating at 80° C. was 2500 cps.

Next, this mixture aqueous solution was concentrated and dried and hardened using a rotary evaporator, and was further heated for 3 hours at 150° C. so as to be dried completely. Further, this hardened material was subjected to burning for 2 hours at 650° C. in the atmosphere. As a result, the Pt catalyst of this example implementation was obtained.

An HRTEM observation of a cross section of the Pt catalyst of this example implementation showed that the Pt catalyst layer was 3 nm in thickness, and the specific surface area according to pulse CO adsorption was 1100 $m^2/g$.

THIRD EXAMPLE IMPLEMENTATION

After dispersing 1 g of the Pt catalyst of the first example implementation in 100 ml of a 1% aqueous solution of hexachloroplatinic acid, 200 ml of a 3.5% aqueous solution of formaldehyde was gradually added thereto. After being retained for 2 hours at 80° C., it was left for 10 hours at room temperature. After being subjected to centrifugal separation and washing with water, an obtained precipitation was heated for 2 hours at 300° C. in an oven of a $N_2$ atmosphere. As a result, the Pt catalyst of the third example implementation was obtained.

An HRTEM observation of a cross section of the Pt catalyst of this example implementation showed that the Pt catalyst layer was 5 nm in thickness, and the specific surface area according to pulse CO adsorption was 1800 $m^2/g$.

FOURTH EXAMPLE IMPLEMENTATION

After dispersing 1 g of the Pt catalyst of the second example implementation in 100 ml of a 1% aqueous solution of hexachloroplatinic acid, 200 ml of a 3.5% aqueous solution of formaldehyde was gradually added thereto. After being retained for 2 hours at 80° C., it was left for 10 hours at room temperature. After being subjected to centrifugal separation and washing with water, an obtained precipitation was heated for 2 hours at 300° C. in an oven of a $N_2$ atmosphere. As result, the Pt catalyst of the fourth example implementation was obtained.

An HRTEM observation of a cross section of the Pt catalyst of this example implementation showed that the Pt catalyst layer was 6 nm in thickness, and the specific surface area according to pulse CO adsorption was 1700 $m^2/g$.

FIFTH EXAMPLE IMPLEMENTATION 200 ml of a 20% aqueous solution of 2-acrylamide-2-methylpropane sulfonate and 200 ml of a 2% aqueous solution of bis-acrylamide were mixed. Further, 1.5 g of hexachloroplatinic acid was added, and was dissolved completely by heating to 60° C. Next, after adding 40 ml of a 10% aqueous solution of potassium persulfate, 0.6 g of KETJEN-BLACK EC-600J was introduced as carrier carbon. Degassing was performed under reduced pressure, and stirring was performed. The subsequent process was performed in the same manner as in the first example implementation. As a result, the Pt catalyst of this example implementation was obtained.

SIXTH EXAMPLE IMPLEMENTATION 200 ml of a 20% aqueous solution of 2-hydroxyethyl-methacrylate and 200 ml of a 2% aqueous solution of 4,4'-bisphenol A-diacrylate were mixed. Further, 1.5 g of hexachloroplatinic acid was added, and was dissolved completely by heating to 60° C. Next, after adding 40 ml of a 10% aqueous solution of potassium persulfate, 0.6 g of KETJEN-BLACK EC-600J was introduced as carrier carbon. Degassing was performed under reduced pressure, and stirring was performed. The subsequent process was performed in the same manner as in the first example implementation. As a result, the Pt catalyst of this example implementation was obtained.

SEVENTH EXAMPLE IMPLEMENTATION 1.5 g of hexachloroplatinic acid was added to 400 ml of a 15% aqueous solution of quaternary-stilbazolium-group-introduced polyvinyl alcohol, and was dissolved completely by heating to 60° C. Next, after adding 40 ml of a 10% aqueous solution of potassium persulfate, 0.6 g of KETJENBLACK EC-600J was introduced as carrier carbon. Degassing was performed under reduced pressure, and stirring was performed. The subsequent process was performed in the same manner as in the first example implementation. As a result, the Pt catalyst of this example implementation was obtained.

EIGHTH EXAMPLE IMPLEMENTATION 1.5 g of hexachloroplatinic acid was added to 200 ml of a 20% aqueous solution of polystyrene sodium sulfonate, and was dissolved completely by heating to 60° C. Next, 0.6 g of KETJENBLACK EC-600J was introduced as carrier carbon. Degassing was performed under reduced pressure, and stirring was performed. 200 ml of a 20% aqueous solution of poly(4-ethylvinyl pyridine) was added to this solution, and was mixed therewith by stirring with a stirrer, so that the solution was gelatinized in 10 minutes. The subsequent process was performed in the same manner as in the first example implementation. As a result, the Pt catalyst of this example implementation was obtained.

NINTH EXAMPLE IMPLEMENTATION 200 ml of a 20% aqueous solution of sodium acrylate and 200 ml of a 2% aqueous solution of 4,4'-bisphenol A-diacrylate were mixed. Further, 1.5 g of hexachloroplatinic acid was added, and was dissolved completely by heating to 60° C. Next, after adding 40 ml of a 10% aqueous solution of potassium persulfate, 0.6 g of KETJENBLACK EC-600J was introduced as carrier carbon. Degassing was performed under reduced pressure, and stirring was performed. The subsequent process was performed in the same manner as in the first example implementation. As a result, the Pt catalyst of this example implementation was obtained.

TENTH EXAMPLE IMPLEMENTATION 200 ml of a 20% aqueous solution of vinylpyrrolidone and 200 ml of a 2% aqueous solution of 4,4'-bisphenol A-diacrylate were mixed. Further, 1.5 g of hexachloroplatinic acid was added, and was dissolved completely by heating to 60° C. Next, after adding 40 ml of a 10% aqueous solution of potassium persulfate, 0.6 g of KETJENBLACK EC-600J was introduced as carrier carbon. Degassing was performed under reduced pressure, and stirring was performed. The subsequent process was performed in the same manner as in the first example implementation. As a result, the Pt catalyst of this example implementation was obtained.

11$^{th}$ EXAMPLE IMPLEMENTATION 1.5 g of hexachloroplatinic acid was gradually added to and was dissolved completely in an 8% aqueous solution of gelatin by heating to 90° C. Next, 0.6 g of KETJENBLACK EC-600J was introduced as carrier carbon. Degassing was performed under reduced pressure, and stirring was performed. After being cooled down slowly to room temperature, this solution was cooled for three hours at 4° C. As a result, a gel was obtained. The subsequent process was performed in the same manner as in the first example implementation. As a result, the Pt catalyst of this example implementation was obtained.

12$^{th}$ EXAMPLE IMPLEMENTATION 1.5 g of hexachloroplatinic acid was gradually added to and was dissolved completely in a 5% aqueous solution of agar by heating to 90° C. Next, 0.6 g of KETJENBLACK EC-600J was introduced as carrier carbon. Degassing was performed under reduced pressure, and stirring was performed. After being cooled down slowly to room temperature, this solution was cooled for three hours at 4° C. As a result, a gel was obtained. The subsequent process was performed in the same manner as in the first example implementation. As a result, the Pt catalyst of this example implementation was obtained.

13$^{th}$ EXAMPLE IMPLEMENTATION 200 ml of a 20% aqueous solution of carboxymethycellulose and 200 ml of a 2% aqueous solution of oligo (ethyleneoxide) acrylate 4,4'-bisphenol A-diacrylate were mixed. Further, 1.5 g of hexachloroplatinic acid was added, and was dissolved completely by heating to 60° C. Next, after adding 40 ml of a 10% aqueous solution of potassium persulfate, 0.6 g of KETJENBLACK EC-600J was introduced as carrier carbon. Degassing was performed under reduced pressure, and stirring was performed. The subsequent process was performed in the same manner as in the first example implementation. As a result, the Pt catalyst of this example implementation was obtained.

14$^{th}$ EXAMPLE IMPLEMENTATION 200 ml of a 20% aqueous solution of polyethyleneoxide-acrylate and 200 ml of a 2% aqueous solution of oligo (ethyleneoxide) acrylate 4,4'-bisphenol A-diacrylate were mixed. Further, 1.5 g of hexachloroplatinic acid was added, and was dissolved completely by heating to 60° C. Next, after adding 40 ml of a 10% aqueous solution of potassium persulfate, 0.6 g of KETJENBLACK EC-600J was introduced as carrier carbon. Degassing was performed under reduced pressure, and stirring was performed. The subsequent process was performed in the same manner as in the first example implementation. As a result, the Pt catalyst of this example implementation was obtained.

15th EXAMPLE IMPLEMENTATION 1.5 g of hexachloroplatinic acid was gradually added to and was dissolved completely in 500 ml of a 10% aqueous solution of pectin by heating to 60° C. Next, 0.6 g of KETJENBLACK EC-600J was introduced as carrier carbon. Degassing was performed under reduced pressure, and stirring was performed. The subsequent process was performed in the same manner as in the second example implementation. As a result, the Pt catalyst of this example implementation was obtained.

16th EXAMPLE IMPLEMENTATION 1.5 g of hexachloroplatinic acid was gradually added to and was dissolved completely in 500 ml of a 10% aqueous solution of polyethyleneglycol (5000 molecular weight) by heating to 60° C. Next, 0.6 g of KETJENBLACK EC-600J was introduced as carrier carbon. Degassing was performed under reduced pressure, and stirring was performed. The subsequent process was performed in the same manner as in the second example implementation. As a result, the Pt catalyst of this example implementation was obtained.

17th EXAMPLE IMPLEMENTATION 1.5 g of hexachloroplatinic acid was gradually added to and was dissolved completely in 500 ml of a 10% aqueous solution of polyacrylamide (2000 molecular weight) by heating to 60° C. Next, 0.6 g of KETJENBLACK EC-600J was introduced as carrier carbon. Degassing was performed under reduced pressure, and stirring was performed. The subsequent process was performed in the same manner as in the second example implementation. As a result, the Pt catalyst of this example implementation was obtained.

18th EXAMPLE IMPLEMENTATION 200 ml of a 30% aqueous solution of acrylamide and 200 ml of a 2% aqueous solution of bis-acrylamide were mixed. Further, 0.3 g of ruthenium trichloride was added, and was dissolved completely by heating to 60° C. Next, after adding 40 ml of a 10% aqueous solution of potassium persulfate, 0.6 g of KETJENBLACK EC-600J was introduced as carrier carbon. Degassing was performed under reduced pressure, and stirring was performed. The subsequent process was performed in the same manner as in the first example implementation and thereafter in the third example implementation. As a result, the Pt catalyst of this example implementation formed of Ru and Pt was obtained.

19th EXAMPLE IMPLEMENTATION 200 ml of a 30% aqueous solution of acrylamide and 200 ml of a 2% aqueous solution of bis-acrylamide were mixed. Further, 1.00 g of hexachloroplatinic acid and 0.25 g of ruthenium trichloride were added so that the Pt-Ru molar ratio was 2:1, and were dissolved completely by heating to 60° C. Next, after adding 40 ml of a 10% aqueous solution of potassium persulfate, 0.6 g of KETJENBLACK EC-600J was introduced as carrier carbon. Degassing was performed under reduced pressure, and stirring was performed. The subsequent process was performed in the same manner as in the first example implementation. As a result, the Pt-Ru alloy catalyst of this example implementation was obtained.

COMPARATIVE EXAMPLE 1.5 g of hexachloroplatinic acid was added to and was dissolved completely in 400 ml of water by heating to 60° C. Next, 0.6 g of KETJENBLACK EC-600J was introduced as conductive carrier carbon particles. Degassing was performed under reduced pressure, and stirring was performed. This solution was subjected to bubbling with nitrogen gas so as to reduce the concentration of oxygen in the solution.

Next, 1000 ml of a 3.5% aqueous solution of formaldehyde was gradually added to this mixture. After being heated for 2 hours at 80° C., the mixture was left at rest for 10 hours at room temperature. Next, the formaldehyde aqueous solution was discharged, washing was performed lightly with water, and suction and filtration were performed. As a result, the Pt catalyst of this comparative example was obtained.

[Evaluation]

Fuel cells were formed using the catalysts of the above-described first through 19th example implementations and comparative example. 20 g of a 5% by mass solution of NAFION was added to 2 g of each catalyst. They were kneaded to be formed like a paste. Next, it was applied to carbon paper (200 cm² in area) by doctor blade coating to be 60 μm in thickness. After moisture was evaporated, it was adhered to one side of a polymer solid electrolyte membrane NAFION N-115 of DuPont [127 μm in thickness]). An electrode for an air electrode formed in the same manner was adhered to the other side. A stainless steel mesh was pressed and attached to each electrode as a collector. These were contained in an acrylic case. A 10% by mass aqueous solution of methanol was supplied to the fuel electrode side at a rate of 30 ml/min., and air was supplied to the air electrode at a rate of 50 ml/min.

A load was connected to each of these fuel cells to measure power generation efficiency.

FIG. 8 is a table showing the power generation efficiency of each of the example implementations and comparative example. The power generation efficiency is expressed by power per fuel cell electrode surface area (W/cm²).

Referring to FIG. 8, the power generation efficiencies of the first and second example implementations were improved to be 1.55-1.65 times that of the conventional Pt catalyst of the comparative example. The power generation efficiencies of the third and fourth example implementations, in which catalyst particulates were further precipitated and attached with respect to the first and second example implementations, were improved to be 1.90-1.95 times that of the comparative example.

A detailed description is given above of preferred example implementations according to the present invention. However, the present invention is not limited to the specifically disclosed embodiments, and variations and modifications may be made without departing from the scope of the present invention.

For instance, the 18th example implementation may be combined suitably with the first through 17th example implementations except the third and fourth example implementations. Further, the first, second and fifth through 18$^{th}$ example implementations may be combined with the third and fourth example implementations. Further, the noble metals of a catalyst layer or catalyst particles may be suitably combined.

According to the present invention, by forming a catalyst layer on the surface of a conductive carrier, a catalyst for a fuel cell having high activity and a high rate of reaction with fuel, a method of manufacturing the same, and a fuel cell employing the catalyst for a fuel cell can be provided.

What is claimed is:

1. A catalyst for a fuel cell, comprising:
a conductive carbon particle having a catalyst layer formed continuously over the entire surface of the conductive carbon particle to fully cover the conductive carbon particle, and said catalyst layer being formed of one of Pt, Ru, and a Pt-based alloy, wherein the catalyst layer is 0.5 nm to 20 nm in thickness, wherein the conductive carbon particle has a resistance of $10^{-1}\Omega\cdot cm$ to $10^{2}$ $\Omega\cdot cm$, further comprising metal particulates formed of one of Pt, Ru, and a Pt-based alloy on a surface of the catalyst layer; and wherein the catalyst is disposed within the fuel cell.

2. The catalyst for a fuel cell as claimed in claim 1, wherein BET values of the carbon particle range from 100 $m^2/g$ to 2000$m^2/g$.

3. The catalyst for a fuel cell as claimed in claim 1, wherein the Pt-based alloy employs Pt as a principal component and includes a Pt group element other than Pt.

4. The catalyst for a fuel cell as claimed in claim 1, wherein a specific surface area according to pulse CO adsorption falls within a range of 200$m^2/g$ to 5000 $m^2/g$.

* * * * *